US008030611B2

(12) United States Patent
Kishi et al.

(10) Patent No.: US 8,030,611 B2
(45) Date of Patent: Oct. 4, 2011

(54) MASS SPECTROMETER, METHOD OF MASS SPECTROMETRY AND PROGRAM FOR MASS SPECTROMETRY

(75) Inventors: Yoshinori Kishi, Hitachinaka (JP); Tsukasa Shishika, Mito (JP); Takuya Saeki, Tokai (JP)

(73) Assignee: Hitachi High-Technologies Corporation, Tokyo (JP)

( * ) Notice: Subject to any disclaimer, the term of this patent is extended or adjusted under 35 U.S.C. 154(b) by 401 days.

(21) Appl. No.: 12/379,646

(22) Filed: Feb. 26, 2009

(65) Prior Publication Data

US 2009/0236516 A1 Sep. 24, 2009

(30) Foreign Application Priority Data

Mar. 18, 2008 (JP) ................................ 2008-069713

(51) Int. Cl.
*B01D 59/44* (2006.01)
*H01J 49/42* (2006.01)

(52) U.S. Cl. ......................... 250/282; 250/281; 250/283

(58) Field of Classification Search .......... 250/281–283, 250/287–289, 291–293
See application file for complete search history.

(56) References Cited

U.S. PATENT DOCUMENTS

| | | | | |
|---|---|---|---|---|
| 7,186,973 | B2 | 3/2007 | Terui et al. | |
| 7,577,538 | B2 * | 8/2009 | Wang | 702/85 |
| 2009/0319234 | A1 * | 12/2009 | Yamada et al. | 703/1 |

FOREIGN PATENT DOCUMENTS

| | | |
|---|---|---|
| EP | 0 898 297 | 12/2005 |
| JP | 11-154486 | 6/1999 |
| JP | 2005-353428 | 12/2005 |

* cited by examiner

*Primary Examiner* — Bernard E Souw
(74) *Attorney, Agent, or Firm* — Antonelli, Terry, Stout & Kraus, LLP.

(57) ABSTRACT

An object of the present invention is to provide a mass spectrometer, a method of mass spectrometry, and a program for mass spectrometry for narrowing the range in which the mass-to-charge ratio is scanned without the ion peak of the fragment ion becoming out of the range. In order to achieve the above object, a mass spectrometer including a control unit, a display unit provided with an user interface, an ionization chamber, a dissociation chamber, a mass separator, and a detector is provided.

16 Claims, 11 Drawing Sheets

MASS SPECTROMETER, METHOD OF MASS SPECTROMETRY AND PROGRAM FOR MASS SPECTROMETRY

CROSS REFERENCE TO RELATED APPLICATIONS

The present application claims benefit of the filing date of Japanese Patent Application No. 2008-069713 filed on Mar. 18, 2008 which is incorporated herein by reference.

FIELD OF THE INVENTION

The present invention relates to a tandem mass spectrometer and a method for performing mass spectrometry of a fragment ion produced by dissociating an ionized sample, and a program thereof.

DESCRIPTION OF THE RELATED ART

First, in mass spectrometry, ion species are produced by ionizing a sample in an ionization chamber. Next, in a mass separator, by scanning a mass-to-charge ratio which is a ratio of a mass number m to a valence z of the ion species (m/z), a plurality of the ion species are separated according to their mass-to-charge ratios. Finally, in a detector, a mass spectrum is obtained by detecting an intensity of detection of the ion species for every mass-to-charge ratio. Because a peak of the intensity of detection of the ion species (an ion peak) to the mass-to-charge ratio appears on the mass spectrum, the mass-to-charge ratio at which the ion peak appears can be extracted as the mass-to-charge ratio of the ion species. Such a mass spectrometry, which does not dissociate the ion species produced by ionizing the sample, is a non-tandem mass spectrometry, and is called as $MS^1$.

In the tandem mass spectrometry, in addition to the ionization chamber, the mass separator, and the detector, a dissociation chamber is provided, and $MS^1$ is performed first. And, in the dissociation chamber, a target ion which corresponds to the ion peak showing particular mass-to-charge ratio is selected from the ion peaks detected in the $MS^1$, and a fragment ion is produced by dissociating and degrading the target ion via collision with gas molecules, etc. And, in the mass separator, the mass-to-charge ratio is scanned again, and the fragment ions are separated according to their mass-to-charge ratios. Like $MS^1$, in the detector, the mass spectrum is obtained by detecting the intensity of detection of the fragment ion for every mass-to-charge ratio. As described above, the target ion is selected and dissociated in one stage, and the resulting fragment ion is separated in the mass separator to be detected by the detector. Such a process is referred to as $MS^2$. Generally, the target ion is selected and dissociated at n stages (where n is a natural number), and the resulting fragment ion is separated in the mass separator to be detected by the detector. Such a process is referred to as $MS^{n+1}$. In addition, when selection and dissociation are performed at multiple stages such as n stages, a new target ion is selected from the fragment ion dissociated at the previous stage and is dissociated to produce a new fragment ion at each stage (e.g., see JP, 11-154486, A (1999))

According to the tandem spectrometry, a substance in the sample can be identified, and quantitative analysis of the substance can be performed. Especially, in recent years, the tandem spectrometry is used to identify a protein-peptide and a metabolite in a crude biological sample, and is used in quantitative analysis of them. Especially, the mass spectrometry is performed on biological samples of a plurality of specimens to compare between patients and healthy individuals, and between before and after medication administration. Because the absence or presence of production, and a component whose production rate is changing are known, it is possible to find a biomarker for diagnosis of disease, to elucidate a metabolism mechanism of a medicine, and to predict medicinal benefits.

In a prior mass spectrometry, a detection sensitivity is improved by repeatedly scanning the mass-to-charge ratio in the mass separator, and by integrating intensities of detection of the ion species and the fragment ion in the detector. However, increasing the number of scanning times renders a total scanning time long. As a result, the time required for mass spectrometry becomes long.

However, not only the number of scanning times, but also the time required for one scanning has an influence on the total scanning time. Specifically, if the scanning of the mass-to-charge ratio in a range which does not contribute to detecting the intensity of detection of the fragment ion is omitted, the time required for one scanning is decreased, thereby decreasing the total time including the time required for repeated scanning. Conversely, if the total time is not changed, the number of scanning times is increased, thereby highly increasing the intensity of detection.

However, if a range in which the mass-to-charge ratio is scanned is merely narrowed, the target ion peak of the fragment ion becomes out of the range.

Accordingly, an object of the present invention is to provide a mass spectrometer, a method of mass spectrometry, and a program for mass spectrometry for narrowing the range in which the mass-to-charge ratio is scanned without the ion peak of the fragment ion becoming out of the range.

SUMMARY OF THE INVENTION

The present invention provides a mass spectrometer, a method of mass spectrometry, and a program for mass spectrometry to cause a computer to execute the method in which the mass number of the target ion divided by a natural number is set as a measuring upper limit, the mass-to-charge ratio is scanned in a range whose upper limit is the measuring upper limit, and the fragment ion is separated according to its mass-to-charge ratio.

BRIEF DESCRIPTION OF THE DRAWINGS

The objects and features of the present invention will become more readily apparent from the following detailed description taken in conjunction with the accompanying drawings in which.

DETAILED DESCRIPTION OF THE INVENTION

Next, embodiments of the present invention are explained in more detail below with reference to the figures. In addition, similar reference numbers are used to denote similar components, and their repeated explanations are omitted.

Figure 1:
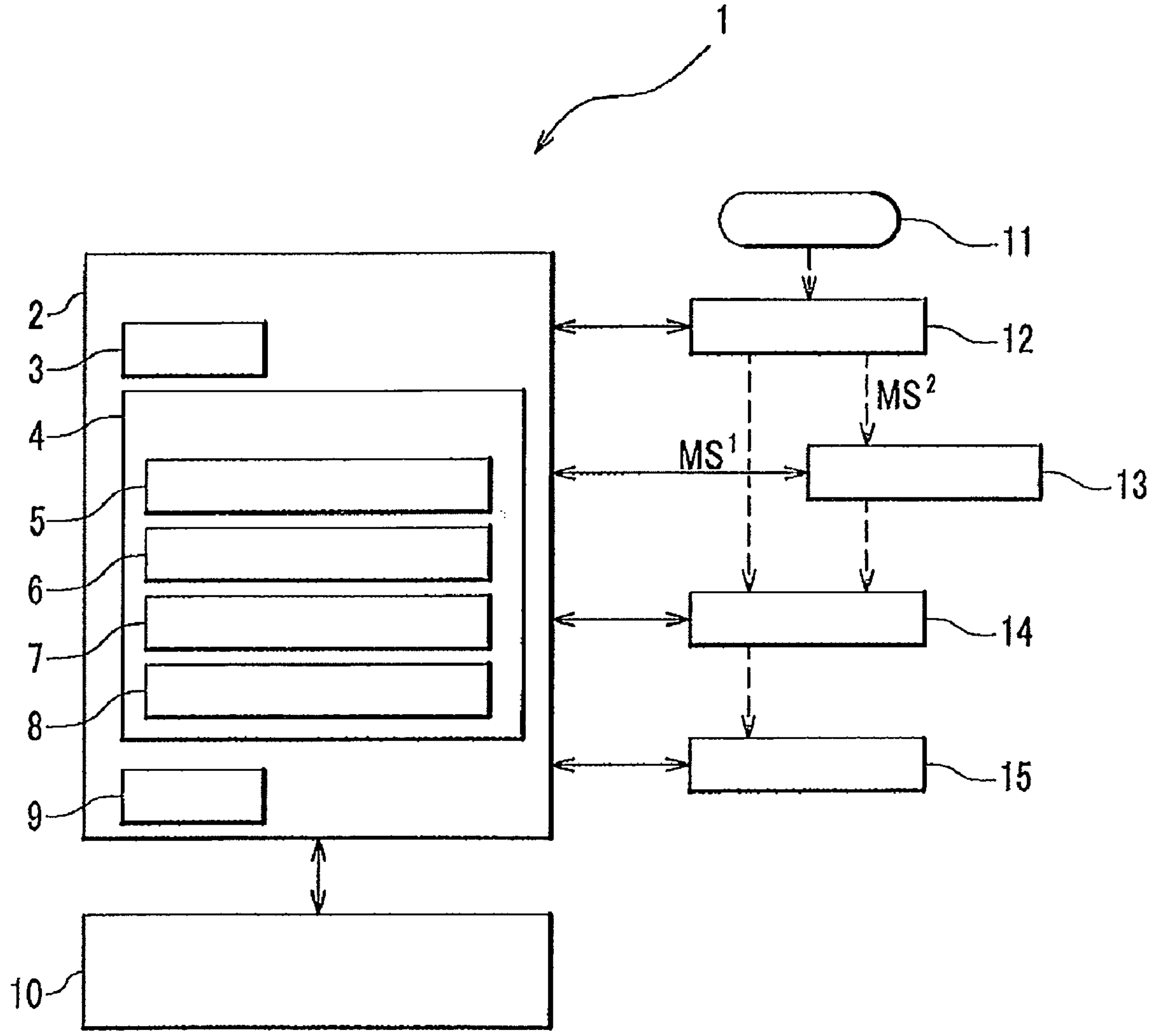
FIG. 1 is a block diagram of a mass spectrometer according to one embodiment of the present invention.

FIG. 1 is a block diagram of a mass spectrometer 1 according to an embodiment of the present invention. The mass spectrometer 1 includes a control unit 2, a display unit 10 provided with an user interface, an ionization chamber 12, a dissociation chamber 13, a mass separator 14, and a detector 15. The control unit 2 includes an extractor 3, a setting unit 4, and a converter 9. Further, the setting unit 4 includes a peak selector 5, a mass number decision unit 6, a measuring lower limit valence decision unit 7, and a calculation unit 8. And, the control unit 2, the extractor 3, the setting unit 4 including the peak selector 5, the mass number decision unit 6, the measuring lower limit valence decision unit 7, the calculation unit 8, and the converter 9 are implemented by causing a computer to execute a program.

Figure 2:
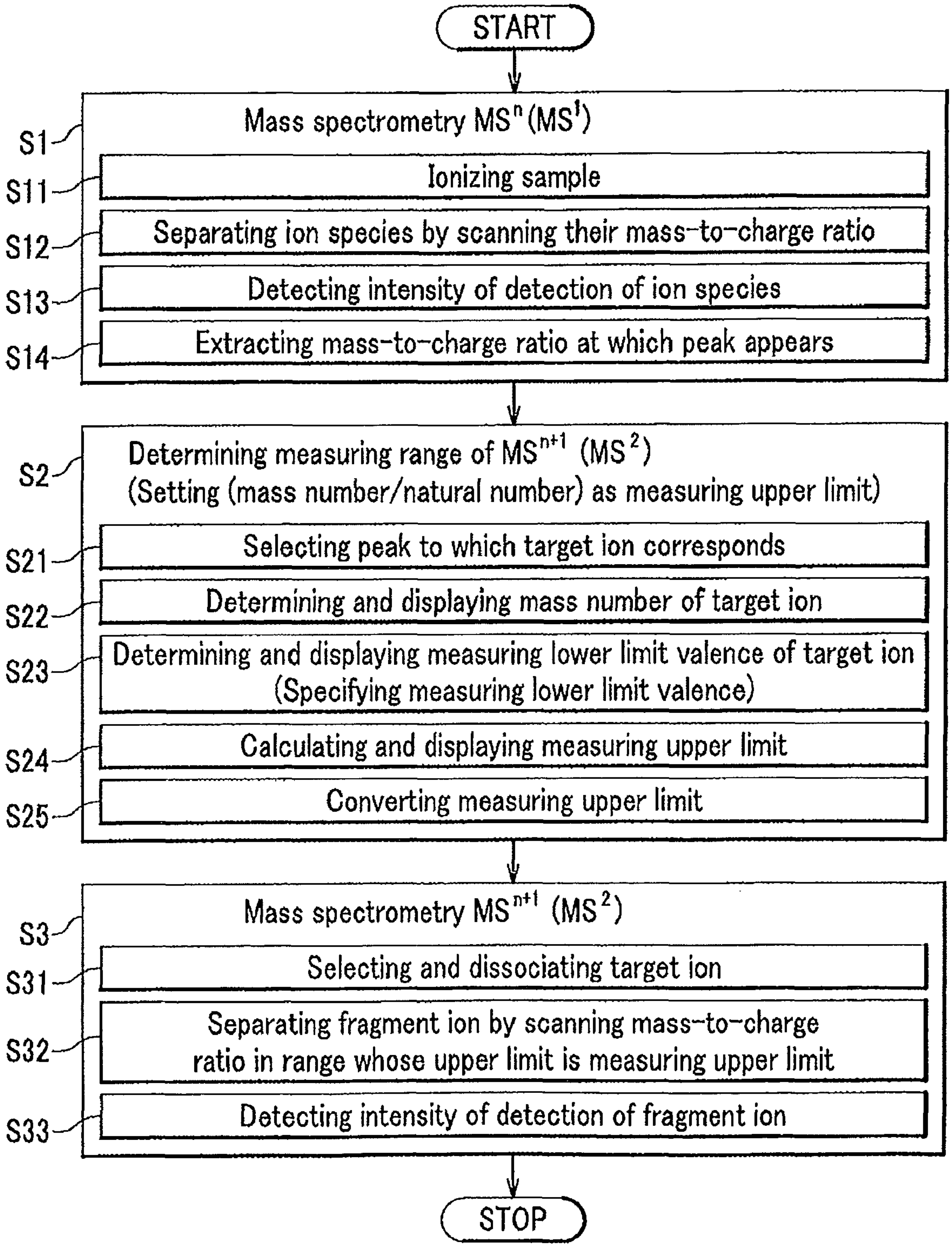
FIG. 2 is a flowchart of a method of mass spectrometry according to one embodiment of the present invention.

FIG. 2 is a flowchart of a method of mass spectrometry using the mass spectrometer 1 according to the embodiment of the present invention.

Figure 3:
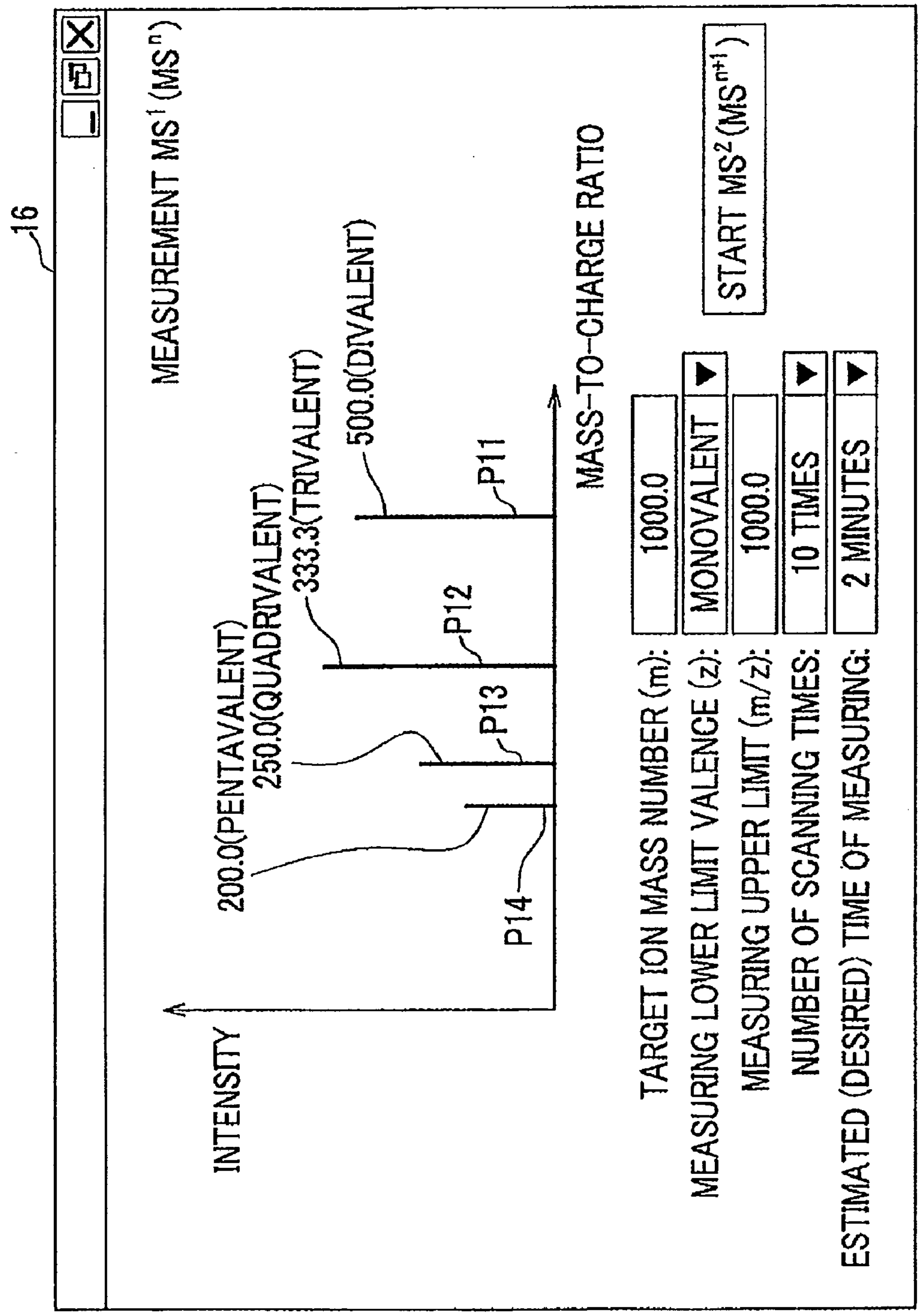
FIG. 3 is a diagram depicting a screen image on a display unit when a measuring lower limit valence is determined to be monovalent, and a measuring upper limit is determined to be 1000.0 which is a mass number of a target ion.

First, in step S1, the mass spectrometry $MS^n$ ($MS^1$) is performed. Specifically, in step S11, the ionization chamber 12 ionizes a sample 11 to produce the ion species. In step S12, the mass separator 14 scans a mass-to-charge ratio, and separates a plurality of the ion species according to their mass-to-charge ratio. In step S13, the detector 15 detects an intensity of detection of the ion species for every mass-to-charge ratio. FIG. 3 is a diagram depicting a screen image 16 on the display unit 10. On the screen image 16, a mass spectrum of the mass spectrometry $MS^n$ ($MS^1$) based on the intensity of detection of the ion species for every mass-to-charge ratio is generated to be displayed.

In step S14 in FIG. 2, the extractor 3 of the control unit 2 extracts the mass-to-charge ratios at which peaks P11-P14 of the mass spectrum appear based on the intensity of detection. For example, in FIG. 3, 500.0 at peak P11, 333.3 at peak P12, 250.0 at peak P13, and 200.0 at peak P14 are extracted as peaks of the mass-to-charge ratio.

Next, in step S2, the setting unit 4 of the control unit 2 determines a measuring range of the mass-to-charge ratio in a mass spectrometry $MS^{n+1}$ ($MS^2$). Specifically, the setting unit 4 sets the mass number of the target ion divided by a natural number as a measuring upper limit based on the mass-to-charge ratios appear at the peaks P11-P14.

More particularly, first, in step S21, the peak selector 5 selects a peak to which the target ion corresponds from the peaks P11-P14. On the mass spectrum in FIG. 3, the mass-to-charge ratios at all appearing peaks P11-P14 are multiplied by corresponding valences to provide measured mass numbers which are equal to 1000.0 each other. Therefore, all peaks P11-P14 are selected corresponding to the target ions.

Next, in step S22, the mass number decision unit 6 determines a mass number of the target ion based on the selected peaks P11-P14. Specifically, the mass number decision unit 6 sets the measured mass number to 1000.0 as the mass number of the target ion. And, as shown in FIG. 3, the display unit 10 displays 1000.0 in a target ion mass number field provided on the screen image 16 as the mass number of the target ion.

Further, in step S23, the measuring lower limit valence decision unit 7 determines a measuring lower limit valence of the target ion. In addition, in decision of the measuring lower limit valence, the measuring lower limit valence may be determined based on the measuring lower limit valence specified by a user. Specifically, the user interface to input the measuring lower limit valence is provided on the display unit 10. As the user interface, a measuring lower limit valence field is provided on the screen image 16 in the form of a list box, and an inverted-triangle button is provided to show a list of options. When the user clicks this inverted-triangle button, a list of a plurality of natural number valences such as "MONOVALENT" "DIVALENT" and "TRIVALENT" etc. is shown. The user can easily specify the measuring lower limit valence by clicking a desired valence in the list. When the measuring lower limit valence is specified by the user, the measuring lower limit valence decision unit 7 determines the measuring lower limit valence according to the specification to display the determined measuring lower limit valence in the measuring lower limit valence field on the screen image 16. In FIG. 3, the monovalent is displayed as the measuring lower limit valence. In addition, the list box may be a combo box combined with a text box to input characters.

In step S24, the mass number of the target ion is divided by the natural number measuring lower limit valence in the calculation unit 8 to calculate the measuring upper limit. Specifically, as shown in FIG. 3, the mass number 1000.0 of the target ion is divided by the monovalent (natural number) of the measuring lower limit valence to calculate 1000.0 as the measuring upper limit, and the calculated measuring upper limit 1000.0 is displayed in the measuring upper limit field on the screen image 16. In addition, in FIG. 3, because the measuring lower limit valence is monovalent, the measuring upper limit is equal to the mass number of the target ion. According to the above description, setting of measuring upper limit using the setting unit 4 is completed.

Also, the user interface to input the number of scanning times and the estimated (desired) time of measuring in the mass spectrometry at the time of $MS^{n+1}$ ($MS^2$) may be provided on the screen image 16.

In this user interface, the number of scanning times field is provided on the screen image 16 in the form of the list box, and the inverted-triangle button is provided to show a list of options. When the user clicks this inverted-triangle button, a list of a plurality of the number of times such as "5 TIMES" "10 TIMES" and "20 TIMES" etc. is shown. The user can easily specify the number of scanning times by clicking a desired number of times in the list. As shown in FIG. 3, the specified number of scanning times such as 10 times can be displayed in the number of scanning times field. When the number of scanning times is specified by the user, the setting unit 4 calculates an estimated (desired) measuring time required for the mass spectrometry $MS^{n+1}$ ($MS^2$) based on the measuring range (scanning range) calculated from the previously set measuring upper limit, and the specified number of scanning times. Basically, the estimated (desired) measuring time is calculated by multiplying a coefficient by a product of the measuring range and the number of scanning times. The calculated estimated (desired) measuring time is displayed in an estimated (desired) measuring time field provided on the screen image 16.

The user can easily judge whether the displayed estimated (desired) measuring time is within the desired measuring time by observing the displayed estimated (desired) measuring time. In this judgment, if the displayed estimated (desired) measuring time is within the desired measuring time, the user clicks a "START MEASUREMENT $MS^{n+1}$ ($MS^2$)" button provided on the screen image 16 to cause the mass spectrometer 1 to start a mass spectrometry $MS^{n+1}$ ($MS^2$) in step S3 described below. On the other hand, if the displayed estimated (desired) measuring time is out of the desired measuring time, the user increases the measuring lower limit valence or decreases the number of scanning times via the user interface so that a recalculated estimated (desired) measuring time is within the desired measuring time. And, after this adjustment, the user clicks the "START MEASUREMENT $MS^{n+1}$ ($MS^2$)" button provided on the screen image 16 to cause the mass spectrometer 1 to start the mass spectrometry $MS^{n+1}$ ($MS^2$) in step S3 described below.

Also, in this user interface, the estimated (desired) measuring time field is provided in the form of a list box, and an inverted-triangle button is provided to show a list of options. When the user clicks this inverted-triangle button, a list of a plurality of times such as "30 SECONDS" "2 MINUTES" and "6 MINUTES" etc. is shown. The user can easily specify the desired measuring time by clicking a desired time in the list. As shown in FIG. 3, the specified desired measuring time such as 2 minutes can be displayed in the estimated (desired) measuring time field. When the estimated (desired) measuring time is specified by the user, the setting unit 4 calculates a number of scanning times required for the mass spectrometry $MS^{n+1}$ ($MS^2$) based on the measuring range (scanning range)calculated from the previously set measuring upper limit, and the specified estimated (desired) measuring time. Basically, the number of scanning times is calculated by multiplying a coefficient by a quotient of the estimated (desired) measuring time divided by the measuring range. The calculated number of scanning times is displayed in the number of scanning times field provided on the screen image 16.

The user can easily judge whether the displayed number of scanning times is more than or equal to the desired number of scanning times by observing the displayed number of scanning times. In this judgment, if the displayed number of scanning times is more than or equal to the desired number of scanning times, the user clicks a "START MEASUREMENT $MS^{n+1}$ ($MS^2$)" button provided on the screen image 16 to cause the mass spectrometer 1 to start a mass spectrometry $MS^{n+1}$ ($MS^2$) in step S3 described below. On the other hand, if the displayed number of scanning times is less than the desired number of scanning times, the user increases the measuring lower limit valence or the estimated (desired) measuring time via the user interface so that a recalculated number of scanning times is more than or equal to the desired number of scanning times. And, after this adjustment, the user clicks the "START MEASUREMENT $MS^{n+1}$ ($MS^2$)" button provided on the screen image 16 to cause the mass spectrometer 1 to start the mass spectrometry $MS^{n+1}$ ($MS^2$) in step S3 described below.

Also, in this user interface, as described above, the user can specify the number of scanning times and the estimated (desired) measuring time via the list in the number of scanning times field and the list in the estimated (desired) measuring time field shown in FIG. 3. The setting unit 4 calculates a maximum measuring range which is measurable in the mass spectrometry $MS^{n+1}$ ($MS^2$) based on the specified number of scanning times and estimated (desired) measuring time. Basically, the maximum measuring range is calculated by multiplying a coefficient by a quotient of the estimated (desired) measuring time divided by the number of scanning times. The setting unit 4 sets the measuring lower limit valence so that the maximum measuring range includes the measuring upper limit. Specifically, the measuring upper limit is calculated for every valence with the measuring lower limit valence being increased by 1-valent to determine whether the measuring upper limit is within the maximum measuring range. The display unit 10 respectively displays a maximum measuring upper limit included in the maximum measuring range, and a minimum measuring lower limit valence corresponding to the maximum measuring upper limit in a measuring upper limit field and a measuring lower limit valence field provided on the screen image 16.

The user can easily judge whether the displayed measuring lower limit valence and measuring upper limit are equal to the desired measuring lower limit valence and measuring upper limit by observing the displayed measuring lower limit valence and measuring upper limit. In this judgment, if the displayed measuring lower limit valence and measuring upper limit are equal to the desired measuring lower limit valence and measuring upper limit, the user clicks a "START MEASUREMENT $MS^{n+1}$ ($MS^2$)" button provided on the screen image 16 to cause the mass spectrometer 1 to start a mass spectrometry $MS^{n+1}$ ($MS^2$) in step S3 described below. On the other hand, if the displayed measuring lower limit valence and measuring upper limit are not equal to the desired measuring lower limit valence and measuring upper limit, the user decreases the number of scanning times or increases the estimated (desired) measuring time via the user interface so that a recalculated measuring lower limit valence and measuring upper limit are equal to the desired measuring lower limit valence and measuring upper limit. And, after this adjustment, the user clicks the "START MEASUREMENT $MS^{n+1}$ ($MS^2$)" button provided on the screen image 16 to cause the mass spectrometer 1 to start the mass spectrometry $MS^{n+1}$ ($MS^2$) in step S3 described below. According to the above process, as shown in FIG. 2, the setting unit 4 can set the measuring upper limit in step S2.

And, in step S25, the converter 9 converts the measuring upper limit to a threshold value corresponding to a physical value controllable in the mass separator 14. In addition, the converter 9 may convert the mass-to-charge ratio to a physical value controllable in the mass separator 14 at the mass spectrometry $MS^n$ ($MS^1$) in step S1, and at the mass spectrometry $MS^{n+1}$ ($MS^2$) in step S3.

Finally, the mass spectrometry $MS^{n+1}$ ($MS^2$) is performed in step S3.

Specifically, first, the dissociation chamber 13 selects a target ion from the ion species produced in step S11, and dissociates the target ion to produce a fragment ion in step S31.

Next, in step S32, the mass separator 14 scans the mass-to-charge ratio, and separates a plurality of the fragment ions according to their mass-to-charge ratios in a range whose upper limit is the measuring upper limit. However, the mass separator 14 can not be controlled at the measuring upper limit. Therefore, in order to scan the mass-to-charge ratio in a range whose upper limit is the measuring upper limit, as the threshold value at a physical value which is able to control the mass separator 14 which corresponds to the measuring upper limit obtained in step S25 being a limit, the physical value is variably controlled.

Finally, in step S33, the detector 15 detects the intensity of detection of the fragment ion for every mass-to-charge ratio.

Figure 4:
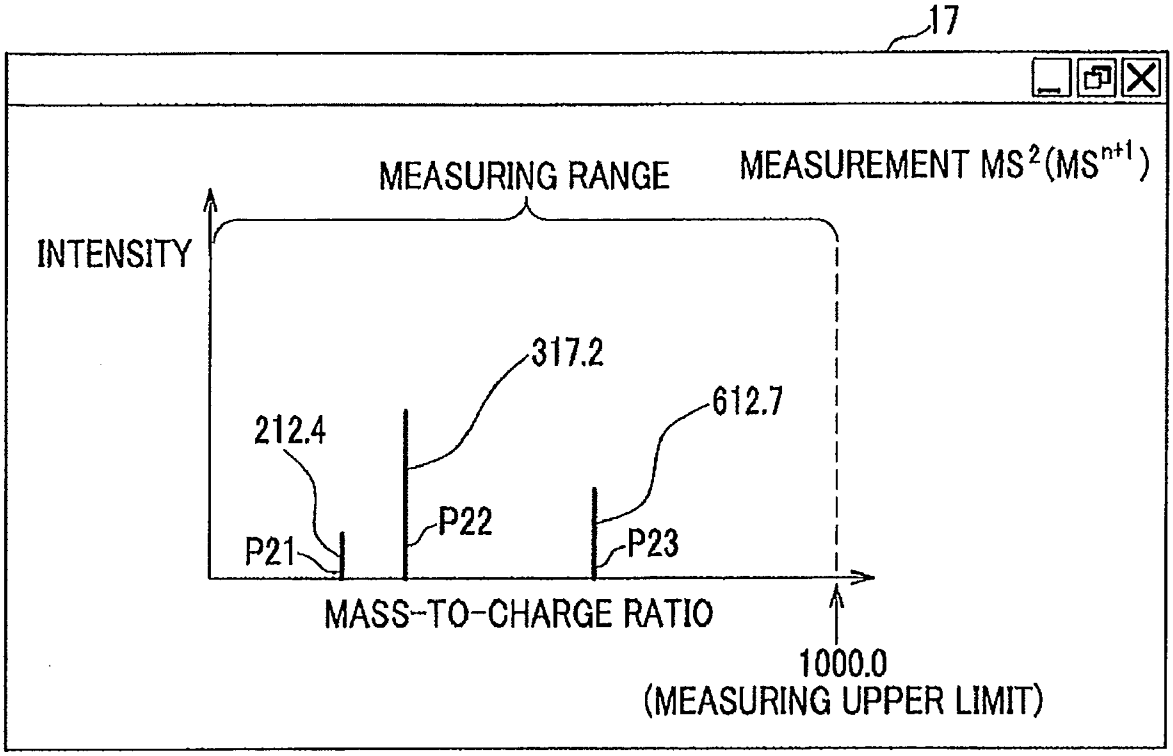
FIG. 4 is a diagram depicting a mass spectrum of $MS^2$ when the measuring lower limit valence is determined to be monovalent, and the measuring upper limit is determined to be 1000.0 which is the mass number of the target ion.

FIG. 3 is a diagram depicting a screen image 17, which is displayed on the display unit 10 after the screen image 16 is displayed, at the intensity of the fragment ion. On the screen image 17, a mass spectrum of a measurement $MS^{n+1}$ ($MS^2$) based on the intensity of detection of the fragment ion for every mass-to-charge ratio is generated to be displayed. The horizontal axis of the mass spectrum represents the mass-to-charge ratio. The measuring range of this mass-to-charge ratio approximately matches the length of the horizontal axis. And, at the right end of the horizontal axis, i.e., at the upper limit (maximum value) of the measuring range of the mass-to-charge ratio, 1000.0 is set as the measuring upper limit. In FIG. 4, a measurement of the mass-to-charge ratio is performed in the measuring range less than or equal to 1000.0. For the fragmention, 612.7 at peak P23, 317.2 at peak P22, and 212.4 at peak P21 are detected as peaks of the mass-to-charge ratio.

In step S2, the setting unit 4 sets the mass number of the target ion divided by a natural number(s) as the measuring upper limit. Further, in step S3, this measuring upper limit is set as an upper limit of the measuring range of the mass spectrometry in $MS^{n+1}$ ($MS^2$). Therefore, the measurement can not be performed in a mass-to-charge ratio range in which the valence is larger than that of the monovalent target ion. The detection of the fragment ion is not performed in this mass-to-charge ratio range. Therefore, when this range is omitted, the time required for every scanning is decreased without omitting the detection of the fragment ion. As a result, the total measuring time including repetition of scanning is decreased. The reason why a measurement of the fragment ion is not performed is that the mass number of the fragment ion is smaller than that of the target ion because the fragment ion is produced by dissociating the target ion.

As described above, if the mass-to-charge ratio range in which the detection of the fragment ion is not performed is omitted, the mass number of the target ion may be set as a measuring upper limit by limiting the natural number(s) to 1. Therefore, when the mass number of the target ion is set as the measuring upper limit, the measuring lower limit valence is fixed to 1, and the determination of the measuring lower limit valence in step S23 and the calculation of the measuring upper limit in step S24 can be omitted.

Figure 5:
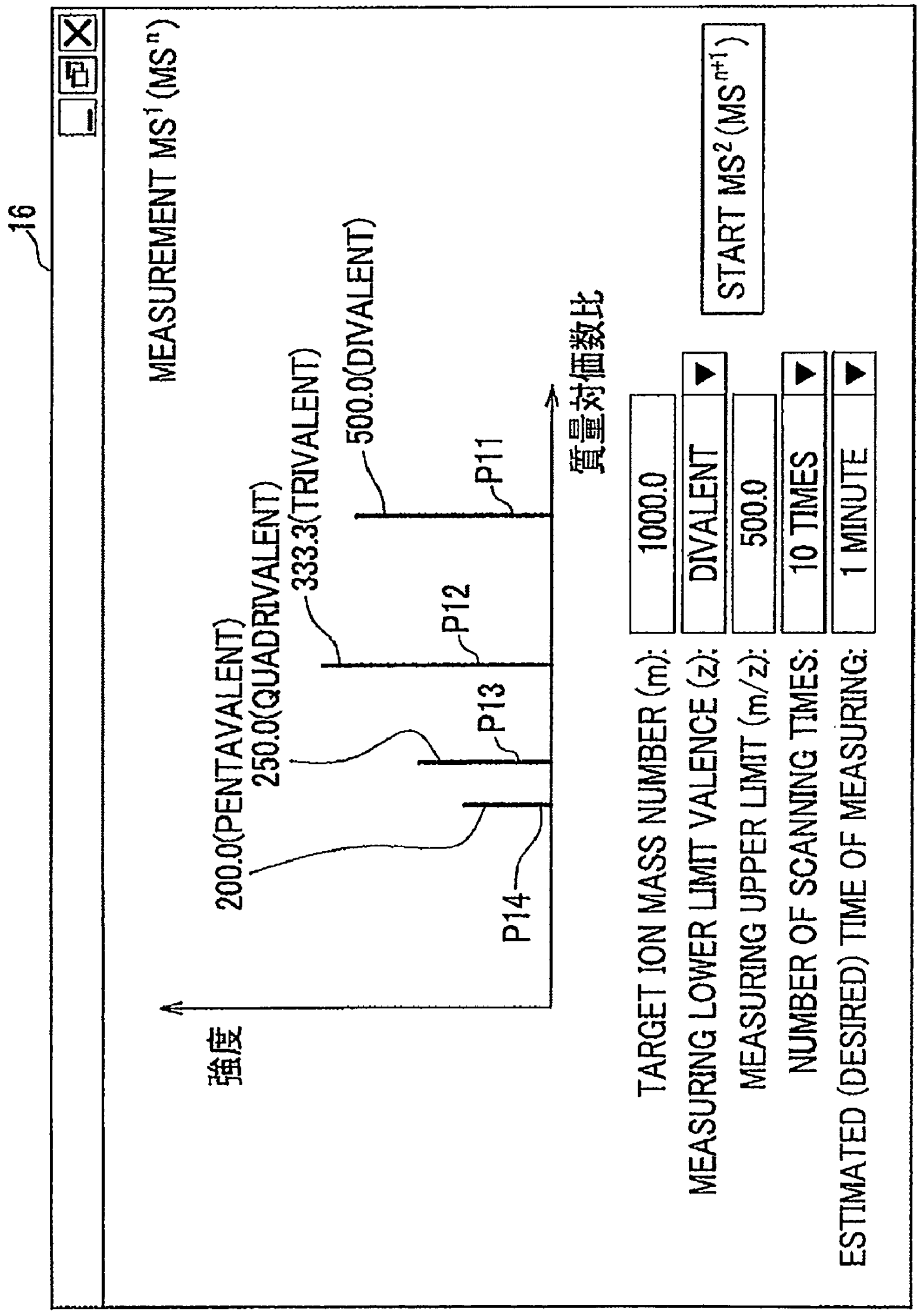
FIG. 5 is a diagram depicting a screen image on a display unit when the measuring lower limit valence is determined to be divalent, and the measuring upper limit is determined to be 500.0 which is half of the mass number of the target ion.
Figure 6:
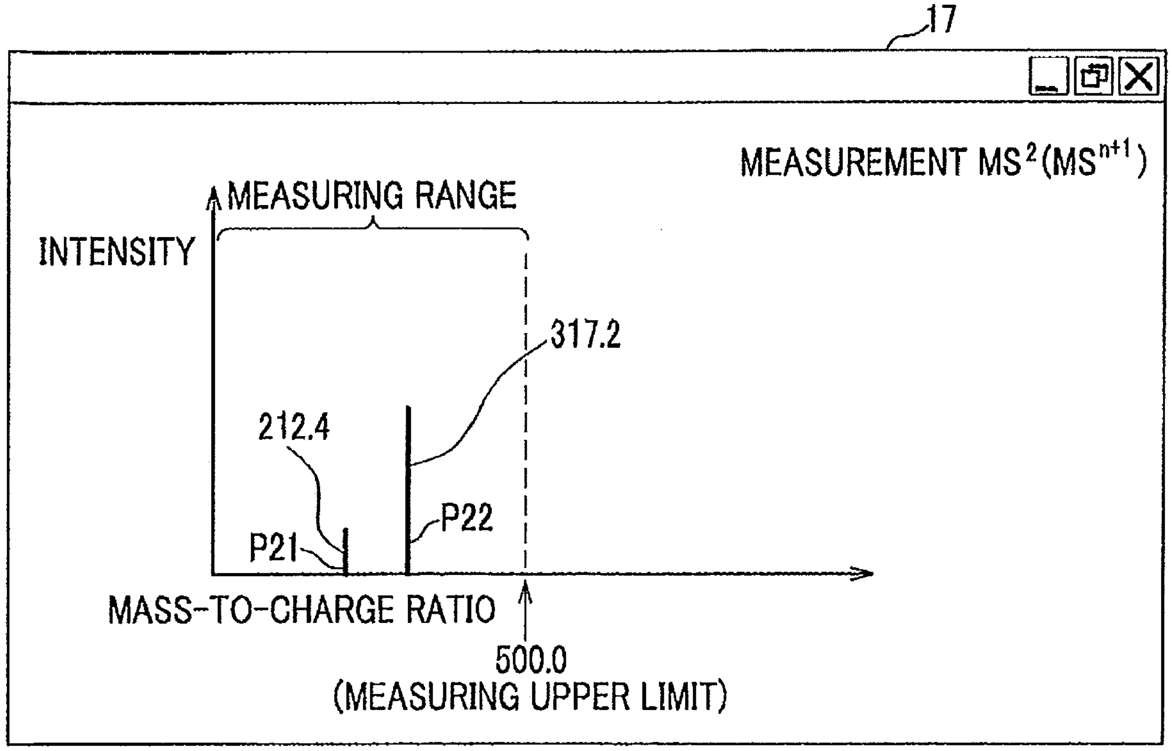
FIG. 6 is a diagram depicting a mass spectrum of $MS^2$ when the measuring lower limit valence is determined to be divalent, and the measuring upper limit is determined to be 500.0 which is half of the mass number of the target ion.

Also, as shown in FIG. 5, when the measuring lower limit valence (the natural number(s)) is more than or equal to 2, the fragment ion having a mass-to-charge ratio which is greater than a mass number of a target ion, whose valence is less than or equal to (s−1), divided by the natural number(s) may not be measured. For example, in FIGS. 3 and 5, the mass number of the target ions are equal to 1000.0. However, the measuring lower limit valences are set to monovalent in FIG. 3 and set to divalent in FIG. 5 respectively. For this reason, the measuring upper limit is 1000.0 in FIG. 3. And, the measuring upper limit is 500.0 in FIG. 5 because the mass number 1000.0 of the target ion is divided by the valence (divalent) which is the measuring lower limit valence. For this reason, as shown in FIG. 6, at the upper limit (maximum value) of the measuring range of the mass-to-charge ratio on the horizontal axis in the mass spectrum, 500.0 is set as the measuring upper limit. The mass-to-charge ratio 612.7 at peak P23, which is detected in FIG. 4, is not detected in FIG. 6.

However, the time required for one scanning is decreased to 1/s of that of the case in which s is equal to 1, thereby decreasing the total measuring time (estimated (desired) measuring time) including the time required for repetition of scanning. For example, the estimated (desired) measuring time is 2 minutes in FIG. 3. However, in FIG. 5, the estimated (desired) measuring time is decreased to 1 minute.

Conversely, if the estimated (desired) measuring time is constant, the number of scanning times can be increased to s times of that of the case in which s is equal to 1. As a result, the measurement sensitivity can be increased to s times of the original sensitivity. Further, the natural number(s) is determined, and a scanning range of the mass-to-charge ratio can be narrowed without the ion peak of the target fragment ion being out of the scanning range.

First Embodiment

Figure 7:
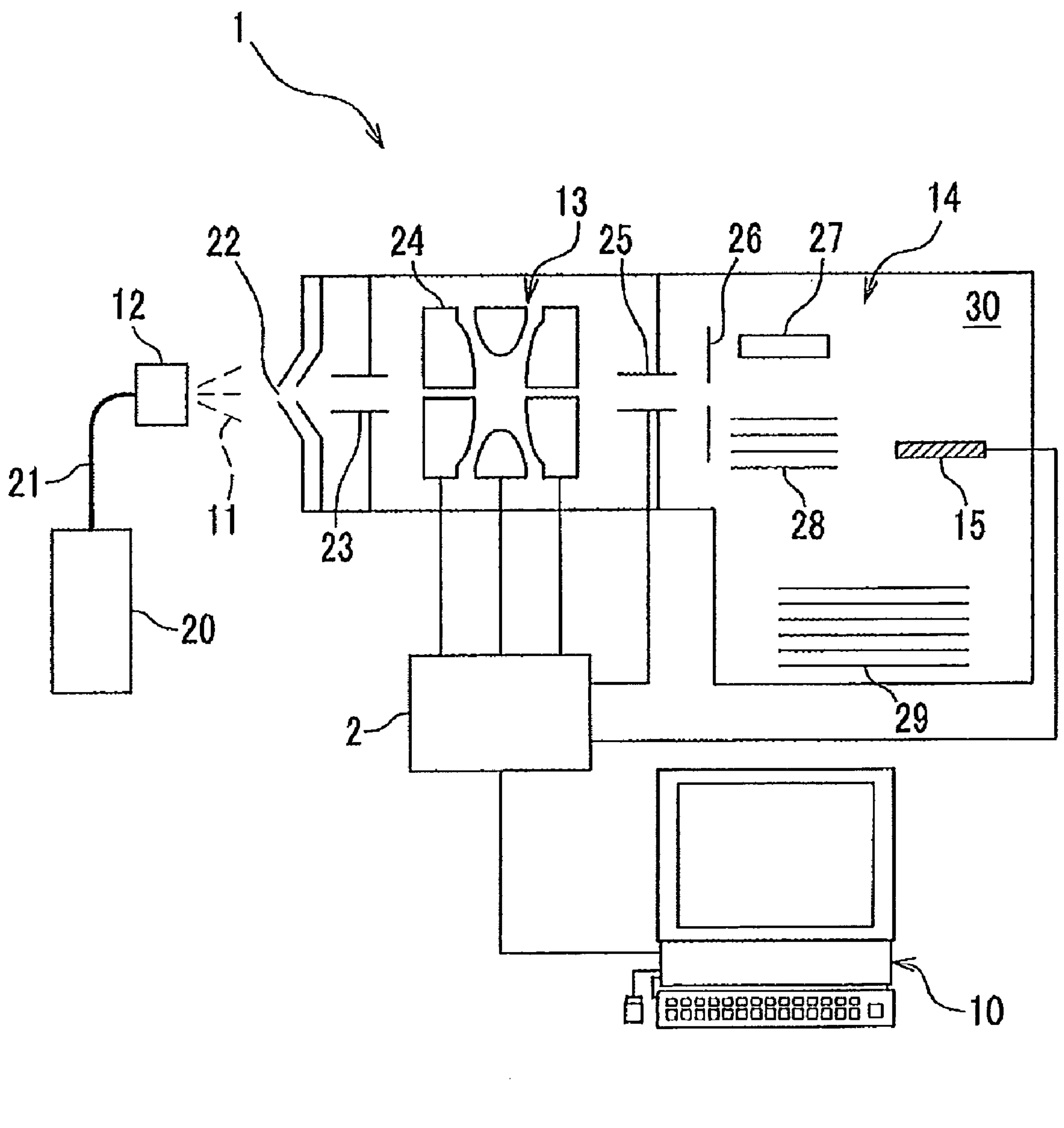
FIG. 7 is a block diagram of an ion trap and time-of-flight type mass spectrometer according to a first embodiment of the present invention.

FIG. 7 is a block diagram of an ion trap and time-of-flight type mass spectrometer 1 according to a first embodiment of the present invention. In the mass spectrometer 1 shown in FIG. 7, a dissociation chamber 13 includes an ion trap unit 24, and a time-of-flight type mass spectrometer 30 includes a mass separator 14 and a detector 15.

A sample 11 flows into a pipe 21 from a sample inlet 20, and arrives at an ionization chamber (ion source) 12 through the pipe 21. The sample 11 is ionized in the ionization chamber 12 using ESI (Electron Spray Ionization) etc. to produce a plurality of ion species. The ionized sample 11 (ion species) is absorbed in a sampling unit 22 by voltage applied thereto, passes through the sampling unit 22, and arrives at an ion transport unit 23. The ion species are moved by voltage applied to the ion transport unit 23, and arrive at the ion trap unit 24 in the dissociation chamber 13.

In $MS^1$, the ion species pass through the ion trap unit 24 and a quadrupole filter 25 in the dissociation chamber 13.

In $MS^2$, the target ion is selected one time by trapping the target ion in the ion species determined in MS' at the ion trap unit 24 to emit other ion species than the target ion. And, at the ion trap unit 24, the target ion is dissociated one time by CID (Collision Induced Dissociation) reaction to produce the fragment ion. In $MS^n$ (n is more than or equal to 3), the target ion is selected from the produced fragment ions by trapping the target ion to emit other ions. The remaining target ion is dissociated to produce a next fragment ion. This process such as selection and dissociation is repeated (n−1) times.

Other ions than the ion species and the fragment ion are removed by the quadrupole filter 25 in the dissociation chamber 13, and the ion species and the fragment ion arrive at the time-of-flight type mass spectrometer 30.

In the time-of-flight type mass spectrometer 30, the mass-to-charge ratios of the ion species and the fragment ion are measured. The time-of-flight type mass spectrometer 30 includes the mass separator 14 to separate the ion species and the fragment ion according to their mass-to-charge ratios, and the detector 15 to detect intensities of detections of the ion species and the fragment ion for every mass-to-charge ratio. Also, the mass separator 14 includes a focusing lens 26, a push electrode 27, an pull electrode 28, and a reflectron 29.

The focusing lens 26 focuses the ion species and the fragment ion to concentrate the spatially-dispersed ion species and fragment ion. The repeller electrode 27 and the extraction electrode 28 give kinetic energy to the ion species and the fragment ion. The quantity of the kinetic energy given to the ion species and the fragment ion depends on the valence, not the mass number. Therefore, when the valence is constant, the given kinetic energy is constant. As a result, the larger the mass-to-charge ratio is, the slower the speed of flight becomes. For this reason, the larger the mass-to-charge ratio is, the longer the time of flight from the detector 15 to the reflectron 29 becomes. From this, the mass-to-charge ratio can be obtained by measuring the time of flight. In addition, the time of flight can be calculated from a time difference between the time when the repeller electrode 27 and the extraction electrode 28 give the kinetic energy to the ion species and the fragment ion and the time when the detector 15 detects the ion species and the fragment ion.

In addition, the time of flight t is expressed as follows:

$$t=L/v=L/(2qV/m)^{0.5}=(L*m^{0.5})/(2qV)^{0.5} \quad (1)$$

where, L is a length of flight, v is a speed of the ion, q(=ez) is an electrical charge of the ion (e: elementary charge, z: valence), V is a voltage applied to the ion, and m is a mass number of the ion. From this, the time of flight t is found to be proportional to 0.5 power of the mass number m of the ion. For this reason, from the equation (1), the larger the mass number m of the ion is, the longer the time of flight t of the ion becomes. When the upper limit of the measuring range of the mass-to-charge ratio is increased, in order to measure the long time of flight t, the measuring time required for every scanning (scanning time) is increased. Therefore, according to the embodiment, the measuring upper limit is set by using the setting unit 4 of the control unit 2 (see FIG. 1), and the measuring upper limit is converted to an upper limit of the time of flight t of the fragment ion by using the converter 9 of the control unit 2 (see FIG. 1). And, the mass separator 14 measures the time of flight t of the fragment ion in a range whose upper limit is the upper limit of the time of flight t. For this reason, the measuring range of the mass-to-charge ratio can be limited, and the measuring time required for one scanning (scanning time) can be decreased.

Second Embodiment

Figure 8:
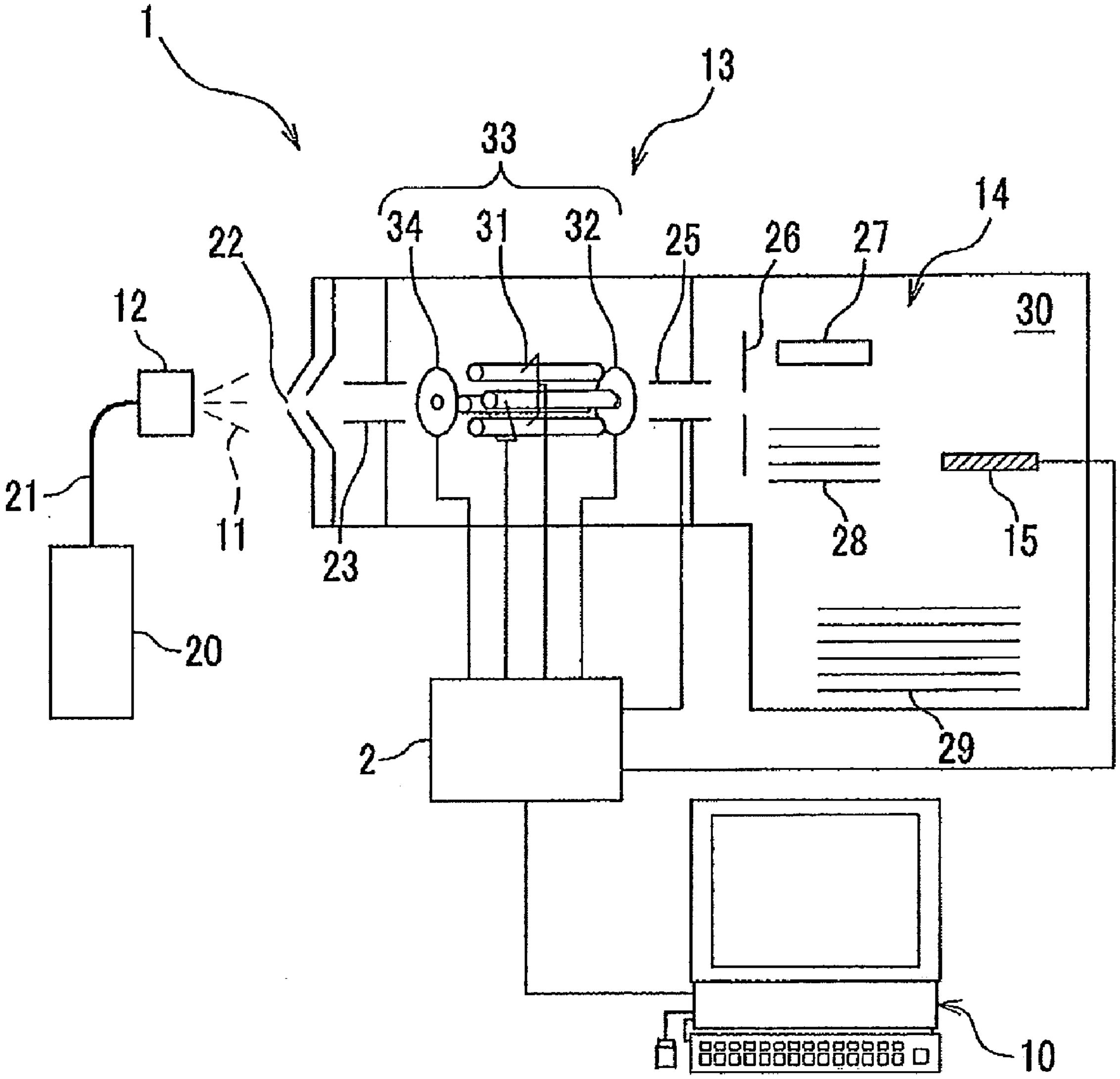
FIG. 8 is a block diagram of a quadrupole and time-of-flight type mass spectrometer according to a second embodiment of the present invention.

FIG. 8 is a block diagram of a quadrupole and time-of-flight type mass spectrometer 1 according to a second embodiment of the present invention. The difference between the mass spectrometer 1 according to the second embodiment and the mass spectrometer 1 according to the first embodiment is that the dissociation chamber 13 is provided with a linear ion trap 33 instead of the ion trap unit 24. The linear ion trap 33 includes an entrance electrode 34, a quadrupole filter (quadrupole) 31, and an exit electrode 32.

The ion species produced by ionizing the sample 11 are confined within the quadrupole filter 31 using voltage applied by the entrance electrode 34 and the exit electrode 32. The quadrupole filter 31 can select a target ion from the ion species by trapping only the target ion from the confined ion species. And, the target ion selected in the quadrupole filter 31 is dissociated by CID reaction to produce a fragment ion. This fragment ion is moved to the time-of-flight type mass spectrometer 30 via the quadrupole filter 25. At the time-of-flight type mass spectrometer 30, the mass-to-charge ratio is measured like the first embodiment.

Third Embodiment

Figure 9:
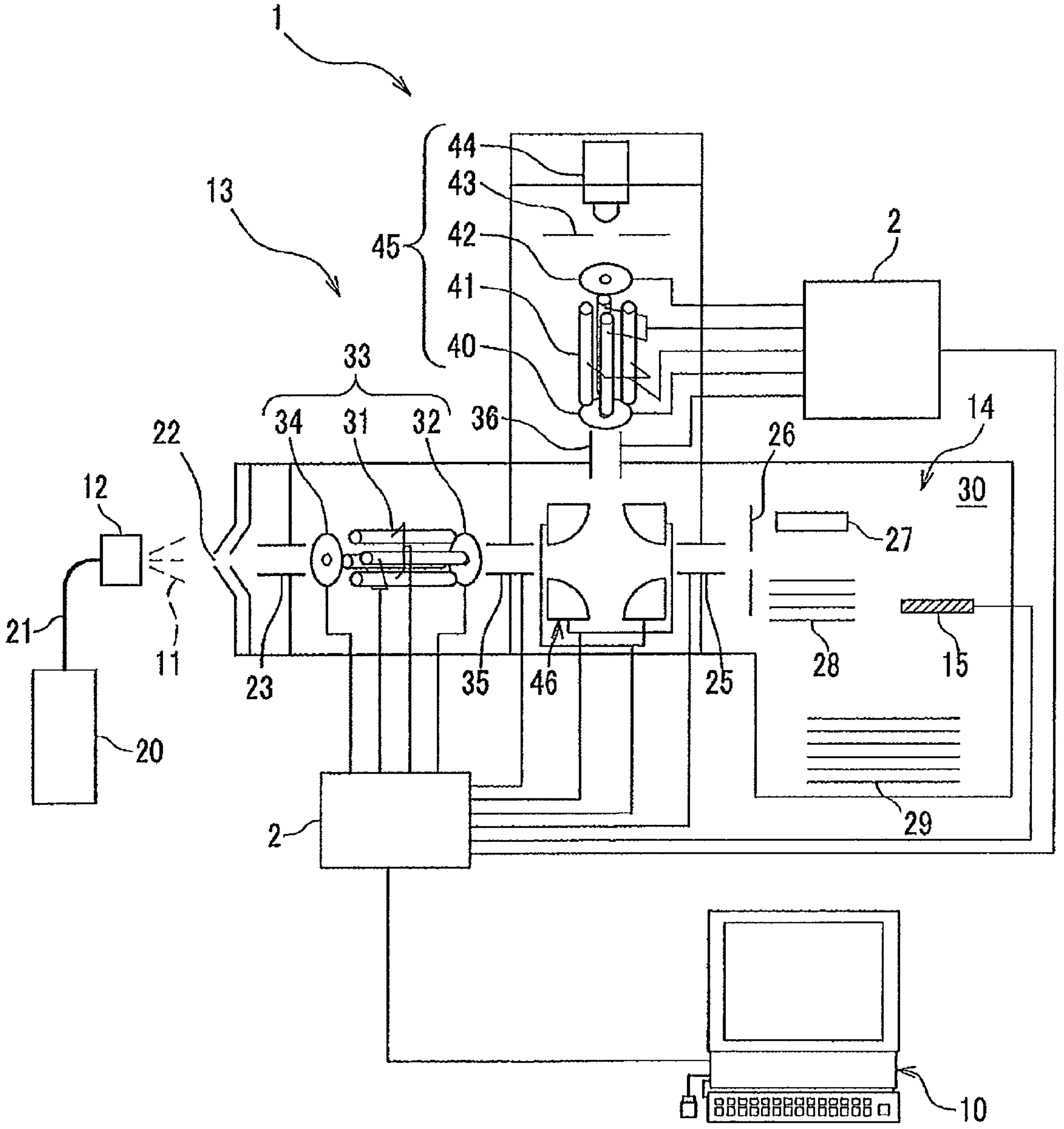
FIG. 9 is a block diagram of a quadrupole and time-of-flight type mass spectrometer according to a third embodiment of the present invention, and an ECD reactor included in the mass spectrometer.

FIG. 9 is a block diagram of a quadrupole and time-of-flight type mass spectrometer 1 according to a third embodiment of the present invention, and an ECD (Electron Capture Dissociation) reactor 45 included in the mass spectrometer 1. The difference between the mass spectrometer 1 according to the third embodiment and the mass spectrometer 1 according to the second embodiment is that the dissociation chamber 13 further includes ion gyrating electrodes 46 and the ECD reactor 45 between the linear ion trap 33 and the time-of-flight type mass spectrometer 30 in addition to the linear ion trap 33. The ECD reactor 45 includes an ECD reactor sample inlet electrode 40, an ECD reactor quadrupole electrode 41, an ECD reactor latch electrode 42, an ECD reactor electronic inflow electrode 43, and a filament 44.

The target ion is emitted from the linear ion trap 33, and is moved to the ECD reactor 45 via the quadrupole filter 35, the ion gyrating electrode 46, and a quadrupole filter 36. The target ion is kept in the ECD reactor quadrupole electrode 41 by the ECD reactor sample inlet electrode 40 and the ECD reactor latch electrode 42. An electron is emitted by the filament 44, flows into the ECD reactor quadrupole electrode 41 via the reactor electronic inflow electrode 43, and is irradiated to the target ion. This electron irradiation causes the target ion to ECD react to be dissociated. And, a fragment ion is produced. This fragment ion is moved to the time-of-flight type mass spectrometer 30 via the quadrupole filter 36, the ion gyrating electrode 46, and the quadrupole filter 25. At the time-of-flight type mass spectrometer 30, the mass-to-charge ratio for the fragment ion is measured like the first embodiment.

Fourth Embodiment

Figure 10:
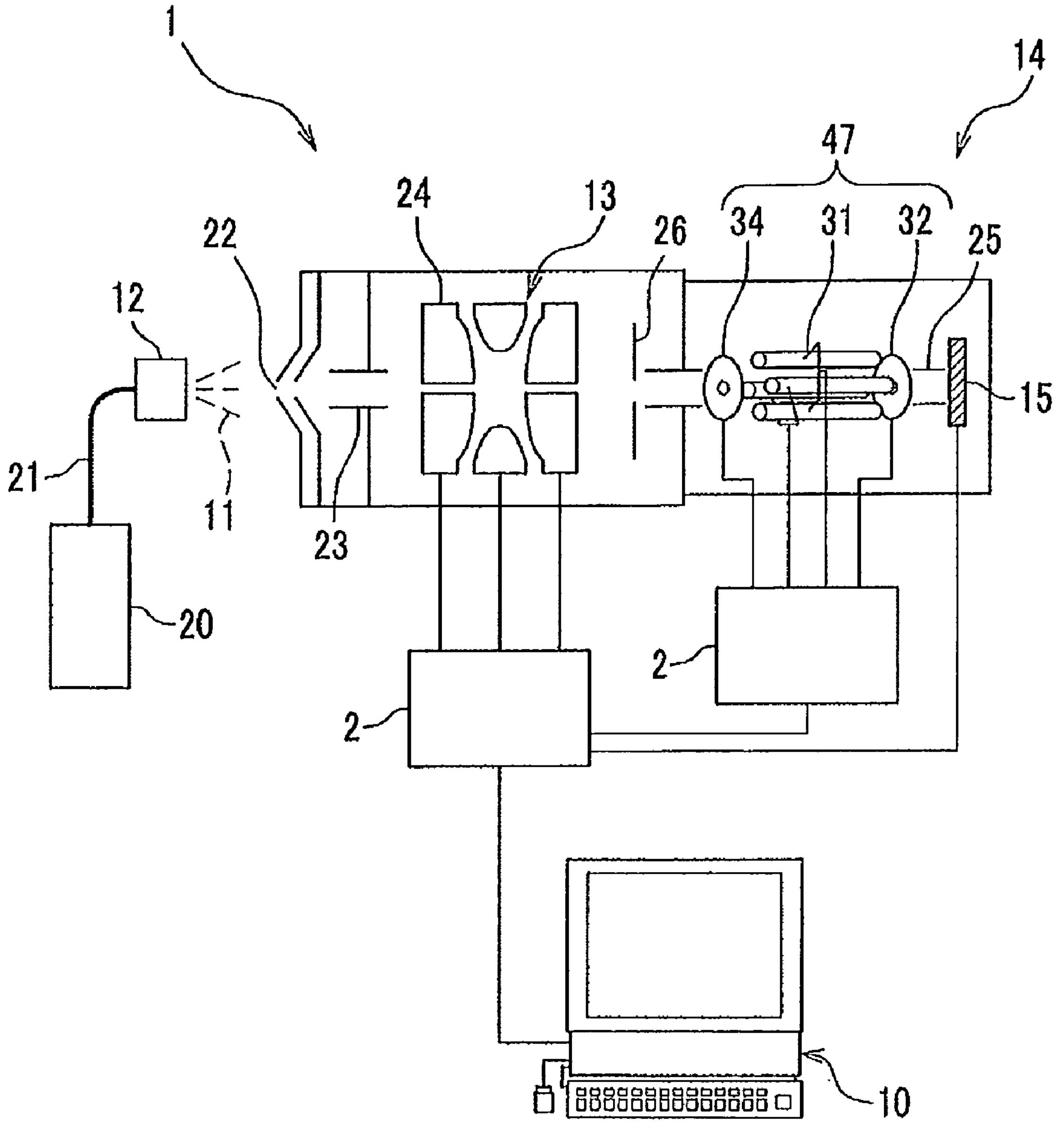
FIG. 10 is a block diagram of an ion trap and quadrupole type mass spectrometer according to a fourth embodiment of the present invention.

FIG. 10 is a block diagram of an ion trap and quadrupole type mass spectrometer 1 according to a fourth embodiment of the present invention. The difference between the mass spectrometer 1 according to the fourth embodiment and the mass spectrometer 1 according to the first embodiment is that the mass separator 14 includes a quadrupole type mass spectrometer 47 instead of the time-of-flight type mass spectrometer 30. Basically, the quadrupole type mass spectrometer 47 has the same structure as that of the linear ion trap 33 (see FIG. 8). Therefore, for the purpose of easy understanding, same reference numerals are used for the same components such as the entrance electrode 34, the quadrupole filter (quadrupole) 31, and the exit electrode 32.

The ion species and the fragment ion are emitted from the ion trap unit 24, are absorbed in the entrance electrode 34, and pass through the quadrupole filter 31 using voltage applied by the entrance electrode 34 and the exit electrode 32. DC voltage and AC voltage are applied to the quadrupole filter 31 by the control unit 2. By applying high-frequency AC voltage, the ion species and the fragment ion can be perturbated. When AC voltage having a high-frequency is applied, the ion species and the fragment ion having uniquely corresponding mass-to-charge ratios pass through the quadrupole filter 31, and are extracted from the exit electrode 32. And, by scanning the frequency of AC voltage in the direction which would decrease, the mass-to-charge ratios of the extracted ion species and fragment ion can be scanned in the direction which would increase.

As with the above described embodiment, when the measuring upper limit is set in the setting unit 4 of the control unit 2 (see FIG. 1), the measuring upper limit is converted to an lower limit of the uniquely corresponding frequency in the converter 9 of the control unit 2 (see FIG. 1). The frequency is scanned in a range whose lower limit is the above described lower limit, and the quadrupole filter 31 allows the fragment ion to pass through itself. For this reason, the measuring range of the mass-to-charge ratio can be limited, and the measuring time required for one scanning (scanning time) can be decreased.

Fifth Embodiment

Figure 11:
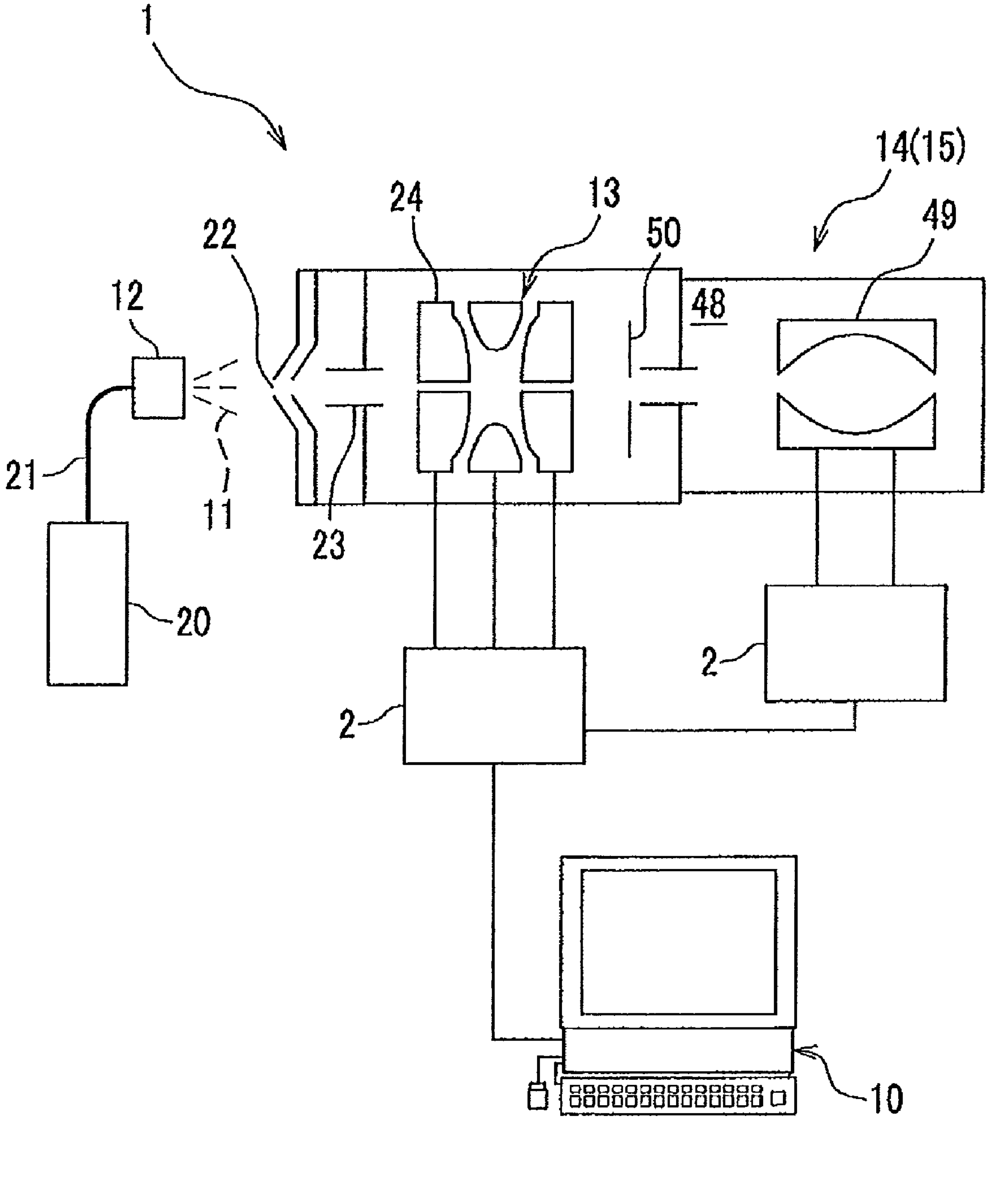
FIG. 11 is a block diagram of an ion trap and FT-ICR type mass spectrometer according to a fifth embodiment of the present invention.

FIG. 11 is a block diagram of an ion trap and FT-ICR type mass spectrometer 1 according to a fifth embodiment of the present invention. The difference between the mass spectrometer 1 according to the fifth embodiment and the mass spectrometer 1 according to the first embodiment is that the mass separator 14 and the detector 15 include a FT-ICR mass spectrometer 48 instead of the time-of-flight type mass spectrometer 30. The FT-ICR mass spectrometer 48 includes an elliptic electrode 49.

The ion species and the fragment ion are emitted from the ion trap unit 24, are absorbed in an entrance electrode 50, and arrive at the elliptic electrode 49. An electrostatic field and a magnetostatic field are generated in the elliptic electrode 49, and a high-frequency AC voltage is applied to the elliptic electrode 49 by the control unit 2. By applying the high-frequency AC voltage, the ion species and the fragment ion begin cyclotron motion. By detecting a rotation period of this cyclotron motion, the mass-to-charge ratio can be calculated by the cyclotron condition. And, by scanning the rotation period of the cyclotron motion in the direction which would increase, the mass-to-charge ratios of the extracted ion species and fragment ion can be scanned in the direction which would increase.

As with the above described embodiment, when the measuring upper limit is set in the setting unit 4 of the control unit 2 (see FIG. 1), the measuring upper limit is converted to an upper limit of the rotation period of the cyclotron motion of the corresponding fragment ion in the converter 9 of the control unit 2 (see FIG. 1). In the elliptic electrode 49, the rotation period is scanned in a range whose upper limit is the above described upper limit, and a Fourier Transform of the voltage changed by the cyclotron motion of the ion species and the fragment ion is carried out if the control unit 2, and the rotation period of the fragment ion is measured. For this reason, the measuring range of the mass-to-charge ratio can be controlled, and the measuring time required for one scanning (scanning time) can be decreased.

What is claimed is:

1. A mass spectrometer comprising:

an ionization chamber for producing ion species by ionizing a sample;

a mass separator for separating a plurality of the ion species according to their mass-to-charge ratios by scanning the mass-to-charge ratio;

a detector for detecting an intensity of detection of the ion species for every mass-to-charge ratio, the mass-to-charge ratio at which a peak of a mass spectrum appears is extracted based on the intensity of detection;

a setting unit for setting a mass number of a target ion divided by a natural number as a measuring upper limit based on the mass-to-charge ratio at which the peak appears; and a dissociation chamber for producing a fragment ion by selecting the target ion from the ion species and dissociating the target ion;

wherein the mass separator separates a plurality of the fragment ions according to their mass-to-charge ratios in a range whose upper limit is the measuring upper limit, and the detector detects the intensity of detection of the fragment ion for every mass-to-charge ratio.

2. The mass spectrometer according to claim 1, wherein the setting unit sets the mass number as the measuring upper limit.

3. The mass spectrometer according to claim 1, further comprising a converter for converting the mass-to-charge ratio to a physical value controllable in the mass separator;

wherein the converter converts the measuring upper limit to a threshold value corresponding to the physical value, and in order to scan the mass-to-charge ratio in a range whose upper limit is the measuring upper limit, as the threshold value being a limit, the physical value is variably controlled.

4. The mass spectrometer according to claim 1, wherein the setting unit comprising:

a peak selector for selecting the peak to which the target ion corresponds from the peaks;

a mass number decision unit for determining a mass number of the target ion based on the selected peaks;

a measuring lower limit valence decision unit for determining a measuring lower limit valence of the target ion; and a calculation unit for calculating the measuring upper limit by dividing the mass number by the measuring lower limit valence.

5. The mass spectrometer according to claim 4, wherein the peak selector selects a plurality of the peaks at which measured mass numbers provided by multiplying the mass-to-charge ratios at which the peaks appears by valences are equals to each other, and the mass number decision unit sets the measured mass number as the mass number of the target ion.

6. The mass spectrometer according to claim 4, further comprising:

a display unit for displaying the mass number of the target ion, and the measuring lower limit valence.

7. The mass spectrometer according to claim 4, further comprising:

an user interface for inputting the measuring lower limit valence;

wherein the user interface allows a user to specify the measuring lower limit valence, and when the measuring lower limit valence is specified by the user, the measuring lower limit valence decision unit determines the measuring lower limit valence to display the measuring lower limit valence on the display unit.

8. The mass spectrometer according to claim 1, further comprising:

a display unit for displaying the measuring upper limit as an upper limit of a range of the mass-to-charge ratio in which the intensity of detection of the fragment ion is detected.

9. The mass spectrometer according to claim 1, further comprising:

a converter for converting the measuring upper limit to an upper limit of a time of flight of the fragment ion;

wherein the mass separator is a time-of-flight type separator, and the time of flight of the fragment ion is measured in a range whose upper limit is the upper limit of the time of flight.

10. The mass spectrometer according to claim 1, further comprising:

a converter for converting the measuring upper limit to an lower limit of a frequency of a high-frequency voltage applied to a quadrupole;

wherein the mass separator is a quadrupole type separator, includes the quadrupole, and allows the fragment ion to pass through itself in a range whose lower limit is the lower limit of the frequency.

11. The mass spectrometer according to claim 1, further comprising:

a converter for converting the measuring upper limit to an upper limit of a rotation period of the fragment ion;

wherein the mass separator is a FT-ICR type separator, and measures the rotation period of the fragment ion in a range whose upper limit is the upper limit of the rotation period.

12. The mass spectrometer according to claim 1, wherein the dissociation chamber includes a quadrupole, and the target ion is dissociated using the quadrupole.

13. The mass spectrometer according to claim 1, wherein the dissociation chamber includes an ion trap, and the ion trap selects the target ion by trapping the target ion.

14. The mass spectrometer according to claim 1, wherein the dissociation chamber includes an electron irradiation mechanism, and the target ion is dissociated using Electron Captured Dissociation.

15. A method for performing mass spectrometry comprising steps of:

ionizing a sample for producing ion species;

separating a plurality of the ion species according to their mass-to-charge ratios by scanning the mass-to-charge ratios;

detecting an intensity of detection of the ion species for every mass-to-charge ratio;

extracting the mass-to-charge ratio at which a peak of a mass spectrum appears based on the intensity of detection;

setting a mass number of a target ion divided by a natural number as a measuring upper limit based on the mass-to-charge ratio at which the peak appears;

dissociating the target ion selected from the ion species to produce a fragment ion;

separating a plurality of the fragment ions according to their mass-to-charge ratio in a range whose upper limit is the measuring upper limit by scanning the mass-to-charge ratios; and detecting an intensity of detection of the fragment ion for every mass-to-charge ratio.

16. A computer readable storage medium, comprising: a program encoded and stored in a computer readable format to cause a computer to execute a method comprising steps of:

ionizing a sample for producing ion species;

separating a plurality of the ion species according to their mass-to-charge ratios by scanning the mass-to-charge ratios;

detecting an intensity of detection of the ion species for every mass-to-charge ratio;

extracting the mass-to-charge ratio at which a peak of a mass spectrum appears based on the intensity of detection;

setting a mass number of a target ion divided by a natural number as a measuring upper limit based on the mass-to-charge ratio at which the peak appears;

dissociating the target ion selected from the ion species to produce a fragment ion;

separating a plurality of the fragment ions according to their mass-to-charge ratio in a range whose upper limit is the measuring upper limit by scanning the mass-to-charge ratios; and detecting an intensity of detection of the fragment ion for every mass-to-charge ratio.

* * * * *